United States Patent [19]

Laver

[11] Patent Number: 5,096,489
[45] Date of Patent: Mar. 17, 1992

[54] LIGHT-STABILIZED INK COMPOSITIONS

[75] Inventor: Hugh S. Laver, Fribourg, Switzerland

[73] Assignee: Ciba-Geigy Corporation, Ardsley, N.Y.

[21] Appl. No.: 569,320

[22] Filed: Aug. 17, 1990

[30] Foreign Application Priority Data

Aug. 25, 1989 [CH] Switzerland ............ 3084/89

[51] Int. Cl.⁵ .................................. C09D 11/00
[52] U.S. Cl. .............................. 106/20; 106/22
[58] Field of Search ................................ 544/180

[56] References Cited

U.S. PATENT DOCUMENTS 3,444,164  5/1969  Luethi et al. ............... 260/248
4,256,493  3/1981  Yokoyama et al.

FOREIGN PATENT DOCUMENTS 165608  12/1985  European Pat. Off.
0374751  6/1990  European Pat. Off.
63-46277  2/1988  Japan.

OTHER PUBLICATIONS

Research Disclosure 22,519 (Jan. 1983).

Primary Examiner—William R. Dixon, Jr.
Assistant Examiner—Margaret V. Einsmann
Attorney, Agent, or Firm—Luther A. R. Hall

[57] ABSTRACT

2-Hydroxyphenyl-s-triazines of formula I

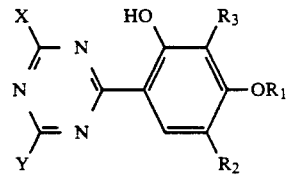

wherein X, Y, $R_1$, $R_2$ and $R_3$ are as defined in claim 1 and at least one of the substituents $R_1$ and $R_2$ is a water-solubilizing group, are suitable light stabilizing additives for aqueous ink compositions, preferably for ink jet printing and appropriate recording materials.

6 Claims, No Drawings

LIGHT-STABILIZED INK COMPOSITIONS

The present invention relates to aqueous ink compositions which contain, as light stabiliser, a water-soluble derivative of a 2-hydroxyphenyl-s-triazine. These ink compositions are particularly suitable for ink jet printing.

Printing by ink jet printing is a very rapid printing method which is controlled by electrical signals. This method comprises jetting fine ink droplets through an orifice on to the recording material. The ink used is preferably an aqueous solution of a water-soluble dye. The dye will normally have a lower lightfastness than the dyestuff pigments used in conventional printing methods. The consequence is that the prints obtained have only a limited storage life when exposed to light.

The proposal has therefore already been made (U.S. Pat. No. 4,256,493) to add a water-soluble UV absorber of the sulfonated hydroxybenzophenone type to the ink. The metal salts of such compounds have also been proposed as light stabilising additives for ink jet printing inks (JP A-46277/88).

The drawback of such benzophenone derivatives and their salts is that they cause discolourations when added to specific dyes, especially black dyes. Furthermore, benzophenone derivatives sometimes have negative effects on the lightfastness of the ink dyes, for example of C.I. Acid Yellow 23.

Carboxylic acid derivatives of UV absorbers of the benzotriazole type have also been proposed in Research Disclosure 22 519 for stabilising dyes and inks. However, these derivatives are not sufficiently soluble in aqueous systems.

It has now been found that specific water-soluble derivatives of 2-hydroxyphenyl-s-triazines are good light stabilising additives for aqueous ink compositions, especially those for ink jet printing, as well as for recording materials which are marked or printed with said aqueous ink compositions.

Specifically, the invention relates to aqueous ink compositions which contain, as light stabiliser, at least one compound of formula I

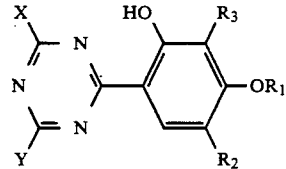

I wherein
$R_1$ is hydrogen, $C_1$-$C_4$alkyl, a group —$R_4$—$SO_3M$ or —$R_4$—$CO_2M$,
$R_2$, if $R_1$ is H or $C_1$-$C_4$alkyl, is a —$SO_3M$ group and, if $R_1$ is —$R_4$—$CO_2M$ or —$R_4$—$SO_3M$, is H or —$SO_3M$,
$R_3$ is hydrogen, Cl or $C_1$-$C_4$alkyl,
$R_4$ is unsubstituted or OH-substituted $C_1$-$C_4$alkylene,
X and Y are each independently of the other a group of formula II or III

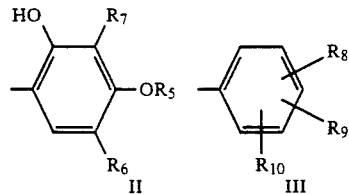

wherein
$R_5$ is hydrogen, $C_1$-$C_4$alkyl, —$R_4$—$CO_2M$ or —$R_4$—$SO_3M$
$R_6$ is hydrogen, Cl, $C_1$-$C_4$alkyl or —$SO_3M$,
$R_7$ is hydrogen, Cl or $C_1$-$C_4$alkyl,
$R_8$, $R_9$ and $R_{10}$ are each independently of one another H, Cl, $C_1$-$C_4$alkyl, phenyl or —$SO_3M$, and
M is hydrogen, Li, Na, K, ½Ca, ½Mg, ½Zn, ½CO(II), ½Cu(II), ½Ni(II), ⅓Cr(III), ⅓Fe(III),

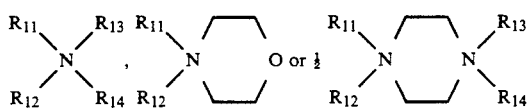

wherein
$R_{11}$, $R_{12}$, $R_{13}$ and $R_{14}$ are each independently of one another H, $C_1$-$C_{12}$alkyl, 2-hydroxyethyl, cyclohexyl, phenyl or benzyl.

A substituent defined as $C_1$-$C_4$alkyl in formula I may be methyl, ethyl, n-propyl, isopropyl, n-propyl, n-butyl, isobutyl, sec-butyl or tert-butyl. $R_4$ as unsubstituted or OH-substituted $C_1$-$C_4$alkylene may be methylene, 1,2-ethylene, 1,3-propylene, 2-hydroxy-1,3-propylene or 1,4-butylene.

Preferred ink compositions are those which contain at least one compound of formula I, wherein either
a) $R_1$ is hydrogen, methyl or ethyl and $R_2$ is —$SO_3M$, or
b) $R_1$ is —$R_4$—$SO_3M$ or —$R_4$—$CO_2M$ and $R_2$ is hydrogen,
$R_3$ is hydrogen, Cl or methyl,
$R_4$ is unsubstituted or OH-substituted $C_1$-$C_3$alkylene,
X and Y are each independently of the other a group of formula II or III, wherein
$R_5$ is hydrogen, methyl, ethyl, —$R_4$—$CO_2M$ or —$R_4$—$SO_3M$,
$R_6$ is hydrogen or —$SO_3M$,
$R_7$ is hydrogen, Cl or methyl,
$R_8$ is hydrogen,
$R_9$ and $R_{10}$ are each independently of the other H, Cl, methyl, ethyl or —$SO_3M$,
M is hydrogen, Li, Na, K, ½Ni(II) or

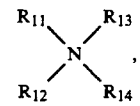

and $R_{11}$, $R_{12}$, $R_{13}$ and $R_{14}$ are each independently of one another H, methyl, ethyl or hydroxyethyl.

Particularly preferred ink compositions are those containing at least one compound of formula I, wherein either
a) $R_1$ is hydrogen or methyl and $R_2$ is —$SO_3M$, or
b) $R_1$ is —$R_4$—$SO_3M$ or —$R_4$—$CO_2M$ and $R_2$ is hydrogen, $R_3$ is hydrogen,
$R_4$ is unsubstituted or OH-substituted $C_1$–$C_3$alkylene,
X and Y are each independently of the other a group of formula II or III, wherein
$R_5$ has the same meaning as $R_1$,
$R_6$ has the same meaning as $R_2$,
$R_7$ is hydrogen,
$R_8$ is hydrogen, $R_9$ is hydrogen or methyl and $R_{10}$ is H, methyl or —$SO_3M$,
M is hydrogen, Li, Na, K, ½Ni(II) or

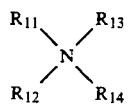

and $R_{11}$, $R_{12}$, $R_{13}$ and $R_{14}$ are each independently of one another H, methyl, ethyl or hydroxyethyl.

M is preferably lithium.

Illustrative of compounds of formula I are the compounds of formulae:

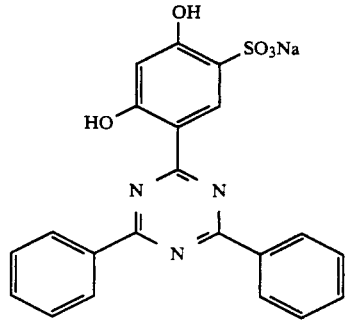

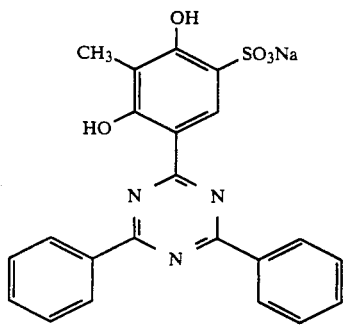

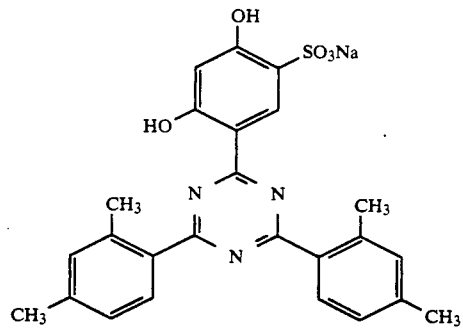

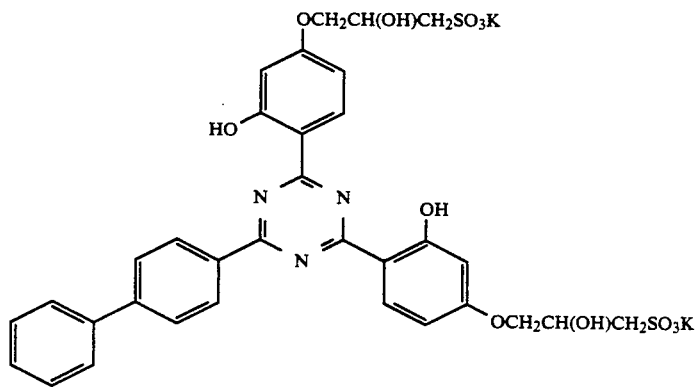

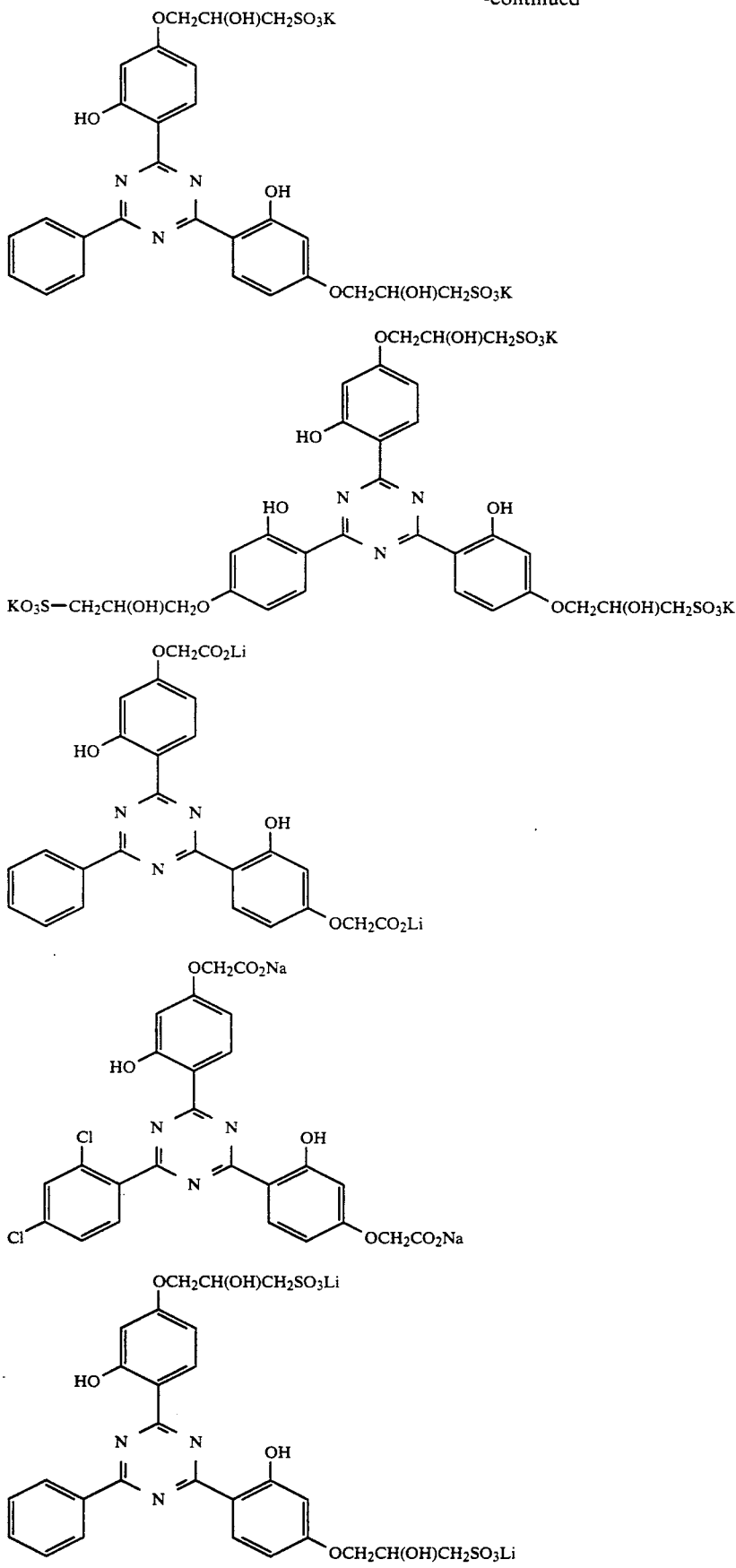

-continued
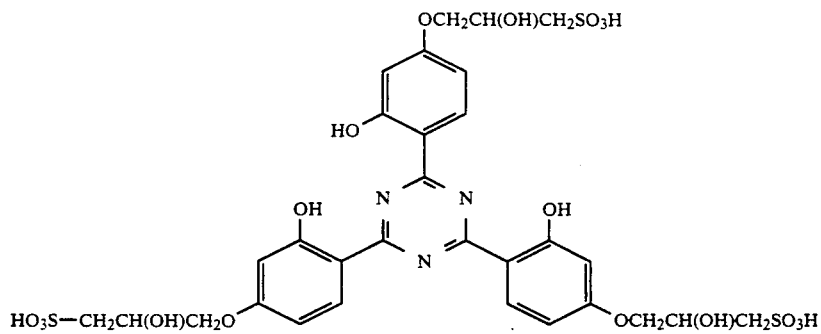
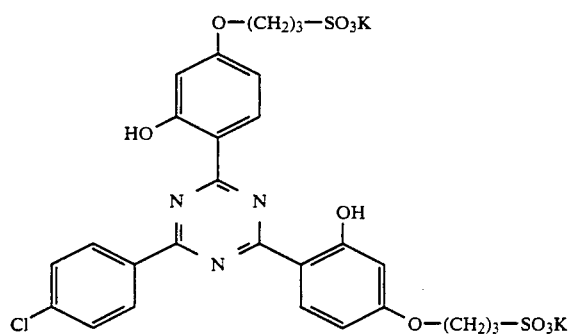
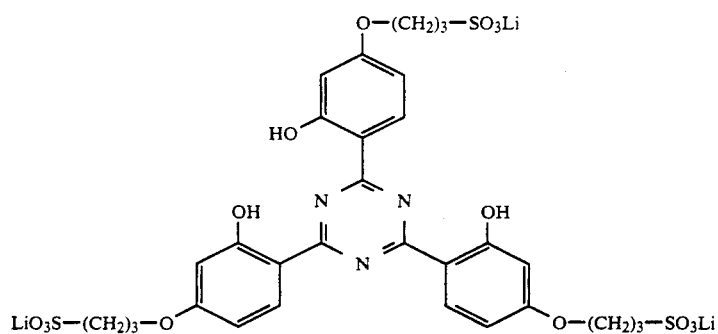
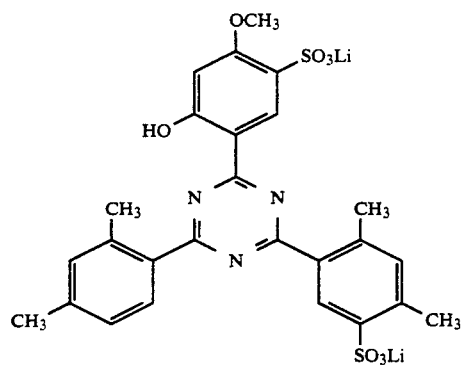

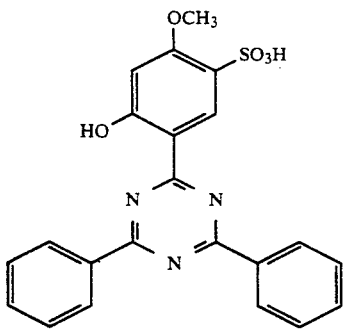

If the compounds of formula I are salts, they may be prepared from the corresponding acids by neutralisation with an appropriate base, for example a hydroxide, carbonate or oxide. The corresponding acids are known compounds or they can be prepared by methods analogous to those for obtaining the known ones (q.v. FR-A 1 494 413, EP-A 165 608 and WO-A 86/3528).

The free acids and the alkali metal salts have been proposed as light stabilisers for photographic dyes and for textile dyes.

The compounds of formula I are preferably added to the ink compositions in an amount of 0.01 to 20% by weight, preferably of 0.1 to 10% by weight. They are readily soluble in these concentrations.

The ink compositions are aqueous compositions. They contain at least 30% by weight of water. In addition to water, they may contain one or more water-miscible solvents such as ethylene glycol, di- or triethylene glycol, propylene glycol or ethers of such glycols, 1,4-butanediol, thiodiglycol, glycerol and the ethers thereof, polyglycerol, mono-, di- and triethanolamine, propanolamine, dimethyl formamide, dimethyl sulfoxide, dimethyl acetamide, N-methylpyrrolidone, methanol, ethanol, isopropanol, n-propanol, diacetone alcohol, acetone, methyl ethyl ketone or propylene carbonate.

The ink compositions preferably contain 50% by weight of water.

The ink compositions contain water-soluble dyes or mixtures of the dyes known for colouring natural fibres. These dyes may be typically mono-, di- or polyazo dyes, triphenylmethane dyes, reactive dyes or phthalocyanine dyes. Examples of such dyes are the dyes Acid Yellow 23, Direct Yellow 86, Acid Red 14, Acid Red 35, Acid Red 52, Acid Red 249, Direct Red 227, Reactive Red 40, Acid Blue 9, Direct Blue 86, Direct Blue 199, Food Black 2, Direct Black 19, Direct Black 38, Direct Black 168 and Sulphur Black 1, listed in the Colour Index. The inks normally contain 0.5–6% by weight of dye.

The ink compositions may also contain minor amounts of various modifiers such as binders, surfactants, biocides, corrosion inhibitors, sequestrants, pH buffers or conductivity additives. They may also contain further water-soluble light stabilisers. Normally, however, the addition of one or more stabilisers of formula I to the ink composition will suffice in the practice of this invention.

The stabilised ink compositions of this invention are preferably used for ink jet printing. They can, however, also be used for all other conventional utilities for inks, for example for felt-tipped pens, ink pads, fountain pens, pen plotters, typewriter ribbons or as printing inks for different printing techniques.

Different techniques are used in ink jet printing, depending on the apparatus employed. Thus, for example, there are drop-on-demand printers, bubble-jet printers, continuous-jet printers or compound-jet printers. The stabilised ink compositions of this invention can be used for all these techniques.

The effect of the addition of a compound of formula I to the ink compositions consists in the enhanced light stability of the printed image produced with the composition. The effect can be measured experimentally by rapid exposure of specimen prints in an exposure apparatus, as shown in the Examples herein. Parts and percentages in these Examples are by weight.

The recording materials of this invention, which are preferably used for ink jet printing, consist of a substrate having a surface which is printable by means of an ink jet. The substrate is normally paper or a plastic sheet and is usually coated on one side with a material which is capable of absorbing ink. This layer will preferably contain $SiO_2$ and polyvinyl alcohol.

Uncoated paper can also be used. In this case, the paper acts simultaneously as substrate and ink absorbing layer. Materials made of cellulosic fibres and textile fibre materials such as cotton fabric or blends of cotton and polyacrylamide or polyester, which materials contain compounds of formula I, can also be used for ink jet printing.

The recording materials can also be transparent, as in the case of projection transparencies.

Alternatively, the compounds of formula I can also be incorporated into recording materials, particularly those suitable for ink-jet printing.

In the first method, the compounds of the formula I can be added directly to the pulp in the paper manufacture.

A second method of application is spraying the substrate with a solution of compounds of formula I. The solution is in this case an aqueous solution or a solution in a slightly volatile organic solvent. Spraying or impregnating the material with an organic solution of a compound of formula I is especially suitable when using oil-soluble compounds of formula I. The use of emulsions or dispersions is also possible.

Normally, however, a coating composition having affinity for dyes is applied to the substrate and the compounds of formula I are added to this composition. The coating compositions normally consist of a solid filler, a binder and conventional additives.

The filler constitutes the bulk of the coating composition. Examples of suitable fillers are $SiO_2$, kaolin, talcum, calcium, magnesium or aluminium silcates, gypsum, zeolith, bentonite, diatomaceous earth, vermiculite, starch or the surface-modified $SiO_2$ described in JP-A 60-260 377. Minor amounts of white pigments such as titanium dioxide, barytes, magnesium oxide, lime, chalk or magnesium carbonate can be used with the filler in the coating composition, provided they do not drastically lower the density of the ink jet print.

Coating compositions suitable for transparent projectable recording materials may not contain any light-scattering particles such as pigments and fillers.

The binder binds the fillers to one another and to the substrate. Typical conventional binders are water-soluble polymers such as polyvinyl alcohol, partially hydrolysed polyvinyl acetate, cellulose ethers, polyvinyl pyrrolidone and copolymers thereof, polyethylene oxide, salts of polyacrylic acid, sodium alginate, oxidised starch, gelatin, casein, vegetable gum, dextrin, albumin, dispersions and polyacrylates or acrylate/methacrylate copolymers, lattices of natural or synthetic rubber, poly(meth)acrylamide, polyvinyl ethers, polyvinyl esters, copolymers of maleic acid, melamine resins, urea resins or the chemically modified polyvinyl alcohols disclosed in JP-A 61-134 290 or JP-A 61-134 291.

An additional dye receptor or a mordant which enhances the fixation of the dye to the coating may be added to the binder. Dye receptors for acid dyes are cationic or amphoteric. Exemplary of cationic receptors are polymeric ammonium compounds such as polyvinylbenzyltrimethylammonium chloride, polydiallyldimethylammonium chloride, polymethacryloxyethyldimethylhydroxyethylammonium chloride, polyvinylbenzylmethylimidazolium chloride, polyvinylbenzylpicolinium chloride or polyvinylbenzyltributylammonium chloride. Further examples are basic polymers such as poly(dimethylaminoethyl)methacrylate, polyalkylenepolyamines and their condensation products with dicyandiamide, amine/epichlorohydrin polycondensates or the compounds disclosed in JP-A-57-36 692, 57-64 591, 57-187 289, 57-191 084, 58-177 390, 58-208 357, 59-20 696, 59-33 176, 59-96 987, 59-198 188, 60-49 990, 60-71 796, 60-72 785, 60-161 188, 60-187 582, 60-189 481, 60-189 482, 61-14 979, 61-43 593, 61-57 379, 61-57 380, 61-58 788, 61-61 887, 61-63 477, 61-72 581, 61-95 977, 61-134 291 or in U.S. Pat. Nos. 4,547,405 and 4,554,181 as well as in DE-A-3 417 582. An amphoteric dye receptor is, for example, gelatin.

The coating having affinity for dyes may contain a number of other additives such as antioxidants, further light stabilisers (also including UV absorbers which do not conform to the light stabilisers of this invention), viscosity improvers, fluorescent whitening agents, biocides and/or antistatic agents.

Representative examples of particularly suitable antioxidants are sterically hindered phenols and hydroquinones, for example the antioxidants disclosed in GB-A 2 088 777 or JP-A-60-72 785, 60-72 786 and 60-71 796.

Representative examples of particularly suitable light stabilisers are organic nickel compounds and sterically hindered amines, for example the light stabilisers disclosed in JP-A-58-152 072, 61-146 591, 61-163 886, 60-72 785 and 61-146 591 or in GB-A-2 088 777, JP 59-169 883 and 61-177 279.

Suitable UV absorbers which may be added to a coating composition in conjunction with compounds of formula I are disclosed, for example, in Research Disclosure No. 24 239 (1984) page 284, GB-A-2 088 777 and EP-A-0 280 650. Suitable UV absorbers for concurrent use with compounds of formula I in recording substrates for ink jet printing are in particular those of the 2-hydroxyphenylbenzotriazole class and, most particularly, 2-(2'-hydroxy-3',5'-di-t-amylphenyl)benzotriazole and 2-(2'-hydroxy-3'-t-butyl-5'-polyglycolpropionate-phenyl)benzotriazole. The UV absorbers can be added to the coating composition as emulsion or dispersion. If the compound of formula I is an acid, it can be dissolved in the coating composition by addition of alkali. Compounds of formula I which are not acids can be dissolved either direct in the coating composition or are added to it in the form of an emulsion or suspension.

The coating composition is normally applied to the substrate, for example paper, and dried by heating. As already mentioned, the compounds of formula I can be also applied to the recording substrate in a separate operation, alone or together with other already described components, as aqueous solution. Application can be made by spraying, by sizing in a sizing press, by a separate coating operation or by immersion in a vat. After subjecting the recording substrate to such an aftertreatment, an additional drying step is necessary.

The recording substrate preferably contains 1 to 10000 mg/m$^2$, most preferably 50 bis 2000 mg$^2$, of at least one compound of formula I.

EXAMPLE 1

A coating composition based on silica/polyvinyl alcohol is prepared from the following components:
16.34 g of a 10% solution of polyvinyl alcohol (Riedel de Haen GmbH)
0.02 g of di-tert-octylphenylpolyethylene oxide
2.00 g of silica (Type 244, W. R. Grace and Co.)
9.54 g of water.

The resultant coating composition is dispersed by ultrasonication and filtered through a sieve of polyester fibers having a mesh size of 24 μm. The pH is adjusted to 7.0 by addition of 2N sodium hydroxide solution.

The coating composition is applied with a wire applicator to photographic paper in a thickness of 36 μm. After drying with warm air, the coating has a dry weight of ca. 5.0 g/m$^2$.

The recording material is printed with an ink composition of this invention which contains a UV absorber of formula I and a comparison ink composition which does not contain a UV absorber.

The ink is prepared as follows:
6 g of the UV absorber is dissolved in a mixture of 80 g of water and 15 g of glycerol. Dye solutions are prepared from 4 g of C.I. Acid Yellow 23 or C.I. Acid Red 35, 80 g of water and 15 g of glycerol. Both solutions are filtered through a membrane filter with a pore size of 0.3 μm, and combined. The printing ink composition so obtained consists of:
80% of water
15% of glycerol
2% of dye
3% of UV absorber.

The blank specimen is prepared by combining the dye solution with equal parts of a mixture of 86 g of water and 15 g of glycerol.

The following UV absorbers are used (prepared according to EP-A 165 608):

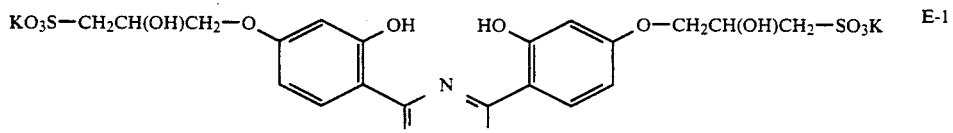

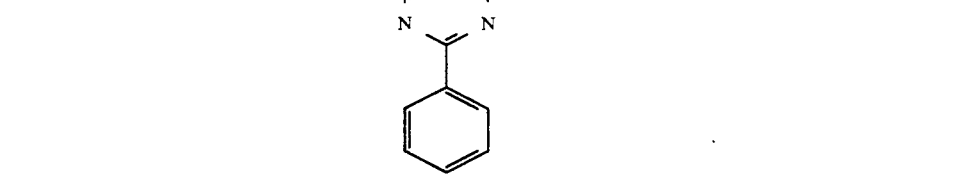

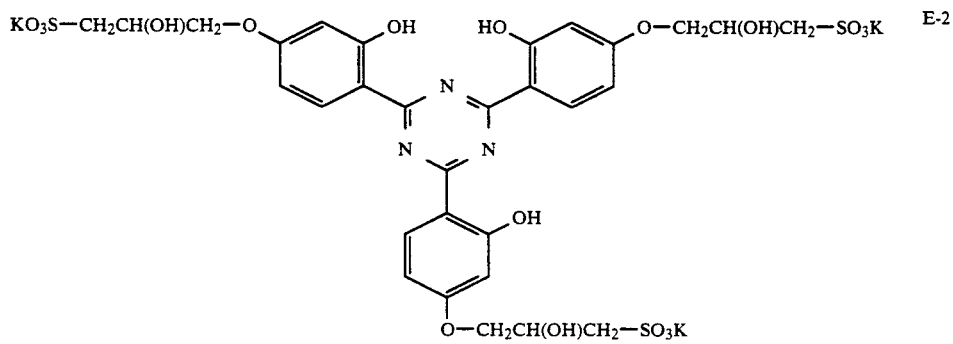

The inks are filled into ink cartridges of a Hewlett-Packard "Think-Jet" ink jet printer. Specimen prints having a density of 192×96 dots per inch (75.6×37.8 dots per cm$^2$) are prepared.

After storage for 1 week to dry out the print completely, the colour intensity of the specimen prints is measured with a Macbeth TR 924 densitometer using a status A filter. The specimen prints are then irradiated in an Atlas Weather-O-Meter with a xenon lamp having an density of 81 klux behind a filter of 6 mm thick window glass at a light energy of up to 10 kJ/cm. The colour density is measured once more to ascertain the percentage loss of intensity.

The results are reported in the following table. Lower values denote higher lightfastness.

| UV absorber | Loss of colour density after exposure to light energy of 10 kJ/cm$^2$ | |
| --- | --- | --- |
|  | C.I. Acid Yellow 23 | C.I. Acid Red 35 |
| none | 51% | 81% |
| 3% of E-1 | 41% | 66% |
| 3% of E-2 | 39% | 63% |

EXAMPLE 2

Specimen prints are prepared as described in Example 1 with the dye C.I. Food Black 2 and the UV absorber E-1. The specimens are exposed as in Example 1 (but only up to 5 kJ/cm$^2$) and the loss of colour density is measured.

| UV absorber | Loss of colour density after exposure to light energy of 5 kJ/cm$^2$ |
| --- | --- |
| none | 15% |
| 3% of E-1 | 11% |

EXAMPLE 3

Specimen prints are prepared as described in Example 1 with the dye C.I. Direct Blue 199 and the UV absorber E-1. The prints are subjected to a light energy of 45 kJ/cm$^2$ and the loss of colour density is measured.

| UV absorber | Loss of colour density after exposure to light energy of 45 kJ/cm$^2$ |
| --- | --- |
| none | 18% |
| 3% of E-1 | 11% |

EXAMPLE 4

A coating composition based on silica/polyvinyl alcohol is prepared with and without water-soluble UV absorber of formula I.

16.36 g of a 10% aqueous solution of polyvinyl alcohol (type 244, Riedel de Haën GmbH), 0.15 g of a 10% aqueous solution of Invadin ® JFC surfactant (Ciba-Geigy AG) and 10.51 g of water were added and stirred together. Next 2.0 g of silica (Syloid type 244, W. R. Grace Co.) were weighed in and dispered with the aid of ultrasound. The resulting coating mixture was filtered through a polyester filter of mesh 24 μm and the pH adjusted to 7.0 with lithium hydroxide. The coating mixture was then coated onto photographic paper base to a thickness of 60 μm with a wirewound coating bar. After drying with warm air, the coating had a dry weight of ca. 8 g/m$^2$.

Similar coatings of in total 8 g/m$^2$ dry coating weight, which contained 1 g/m$^2$ water-soluble UV absorber of the formula I are prepared in a similar manner to that described above. Here, however, 14.12 g of water and an additional 0.52 g of the UV absorber E-1, respectively E-2 were used. The UV absorber was dissolved directly in the polyvinyl alcohol/surfactant mixture.

As a comparison an ink-jet recording paper of coating weight 8 g/m$^2$ containing 1 g/m$^2$ of an emulsifiable UV absorber mixture was prepared. The mixture consisted of 50% β-[3-(2-H-benzotriazole-2-yl)-4-hydoxy- 5-tert-butyl-phenyl]-propionic acid-polyethylene glycol 300 ester, 38% bis-{β-[3-(2-H-benzotriazole-2-yl)-4-hydroxy-5-tert-butylphenyl]-propionic acid}-polyethylene glycol 300 ester and 12% polyethylene glycol 300. An emulsifier: Katemul IG-70 (Scher Chemicals Inc.) was used to emulsify the liquid UV absorber mixture, as is described in Research Disclosure 295115 (November 1988). Thus 16.36 g of a 10% aqueous polyvinyl alcohol solution, 0.23 g Katemul IG-70 and 15.06 g water were stirred together and 0.54 g of the above UV absorber mixture are weighed and stirred in and then emulsified using ultrasound. 2.0 g of silica were then added and dispersed using a second application of ultrasound. The coating mixture was then neutralised and filtered and used to make an ink-jet paper coating in the same manner as is described above.

An ink-jet ink was prepared from 2.5 g C.I. Acid Yellow 17 dissolved in 48.75 g of water and 48.75 g of diethylene glycol. The ink was then printed onto the above specially-prepared papers in the manner described in Example 1. The lightfastness of the prints was likewise assessed analogously.

After a total irradiation energy of 5 kJ/cm², a density loss of 70% was obtained for the sample which contained no UV absorber. In contrast, the samples that contained the UV-absorbers of the invention E-1 and E-2 showed density losses of only 23 and 30% respectively. The density loss of the sample with the emulsifiable UV absorber, however, was 91%. It is clear that, under the conditions of the test, the UV absorbers of the invention show advantageous effects on the lightfastness; whereas the effect of the comparison UV absorber is disadvantageous.

EXAMPLE 5

The ink-jet papers used in example 4 that contained no UV absorber and the UV absorbers E-1 and E-2 of the invention were printed with ink-jet inks containing different dyes and assessed for lightfastness. Instead of C.I. Acid Yellow 17 the dyes C.I. Acid Red 14, C.I. Acid Red 249 and C.I. Direct Red 227 were used to make ink-jet inks as described in example 4. The results after 10 kJ/cm² exposure are shown below:

| UV Absorber | Colour density loss (%) | | |
|---|---|---|---|
| | Acid Red 14 | Acid Red 249 | Direct Red 227 |
| none | 61 | 41 | 53 |
| E-1 | 29 | 27 | 33 |
| E-2 | 36 | 27 | 41 |

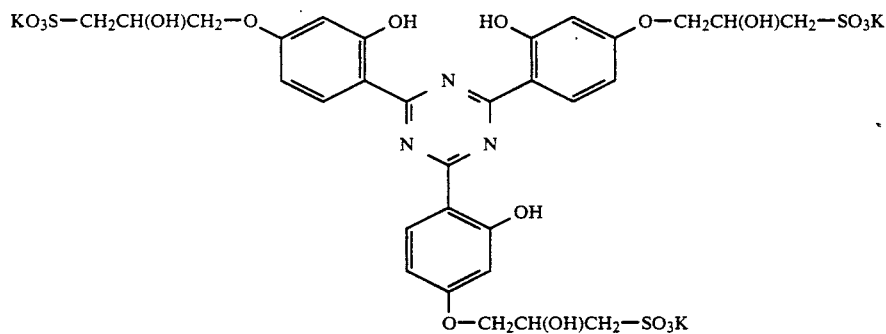

What is claimed is:

1. A method of stabilizing an ink jet print against the deleterious effects of light which comprises preparing an aqueous solution containing at least 30% by weight of water and
   (i) an effective coloring amount of a water soluble dye, and
   (ii) 0.01 to 20% by weight, based on the total solution, an effective stabilizing amount, of at least one compound of formula I

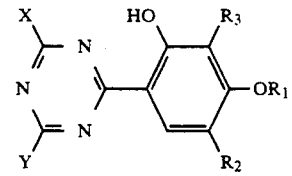

wherein
$R_1$ is hydrogen, $C_1$-$C_4$alkyl, a group —$R_4$—$SO_3M$ or —$R_4$—$CO_2M$,
$R_2$, if $R_1$ is H or $C_1$-$C_4$alkyl, is a —$SO_3M$ group and, if $R_1$ is —$R_4$—$CO_2M$ or —$R_4$—$SO_3M$, is H or —$SO_3M$,
$R_3$ is hydrogen,
$R_4$ is unsubstituted or OH-substituted $C_1$-$C_4$alkylene,
X and Y are each independently of the other a group of formula II or III

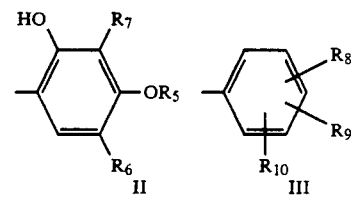

wherein
$R_5$ is hydrogen, $C_1$-$C_4$alkyl, —$R_4$—$CO_2M$ or —$R_4$—$SO_3M$
$R_6$ is hydrogen, Cl, $C_1$-$C_4$alkyl or —$SO_3M$,
$R_7$ is hydrogen,
$R_8$, $R_9$ and $R_{10}$ are each independently of one another H, Cl, $C_1$-$C_4$alkyl, phenyl or —$SO_3M$, and
M is hydrogen, Li, Na, K, ½Ca, ½Mg, ½Zn, ½Co(II), ½Cu(II), ½Ni(II), ⅓Cr(III), ⅓Fe(III),

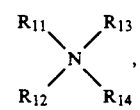

wherein
$R_{11}$, $R_{12}$, $R_{13}$ and $R_{14}$ are each independently of one another H, $C_1$-$C_{12}$alkyl, 2-hydroxyethyl, cyclohexyl, phenyl or benzyl, and then applying said aqueous solution as an ink onto a recording material for ink jet printing to form an ink jet print containing an effective stabilizing amount of said compound of formula I.

2. A method according to claim 1 where in the compound of formula I, either
   a) $R_1$ is hydrogen, methyl or ethyl and $R_2$ is —$SO_3M$, or
   b) $R_1$ is —$R_4$—$SO_3M$ or —$R_4$—$CO_2M$ and $R_2$ is hydrogen,
   $R_3$ is hydrogen,
   $R_4$ is unsubstituted or OH-substituted $C_1$-$C_3$alkylene,
   X and Y are each independently of the other a group of formula II or III, wherein
   $R_5$ is hydrogen, methyl, ethyl, —$R_4$—$CO_2M$ or —$R_4$—$SO_3M$
   $R_6$ is hydrogen or —$SO_3M$,
   $R_7$ is hydrogen,
   $R_8$ is hydrogen, $R_9$ and $R_{10}$ are each independently of the other H, Cl, methyl, ethyl or —$SO_3M$, M is hydrogen, Li, Na, K, $\frac{1}{2}$Ni(II) or

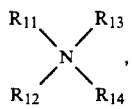

and $R_{11}$, $R_{12}$, $R_{13}$ and $R_{14}$ are each independently of one another H, methyl, ethyl or hydroxyethyl.

3. A method according to claim 1 where in the compound of formula I either a) $R_1$ is hydrogen or methyl and $R_2$ is —$SO_3M$ or
b) $R_1$ is —$R_4$—$SO_3M$ or —$R_4$—$CO_2M$ and $R_2$ is hydrogen, $R_3$ is hydrogen, $R_4$ is unsubstituted or OH-substituted $C_1$-$C_3$alkylene, X and Y are each independently of the other a group of formula II or III, wherein $R_5$ has the same meaning as $R_1$, $R_6$ has the same meaning as $R_2$, $R_7$ is hydrogen, $R_8$ is hydrogen, $R_9$ is hydrogen or methyl and $R_{10}$ is H, methyl or —$SO_3M$, M is hydrogen, Li, Na, K, $\frac{1}{2}$Ni(II) or

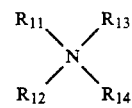

and $R_{11}$, $R_{12}$, $R_{13}$ and $R_{14}$ are each independently of one another H, methyl, ethyl or hydroxyethyl.

4. A method according to claim 1 wherein component (ii) is 0.1 to 10% by weight based on the total solution.

5. A method according to claim 1 wherein the compound of formula I is

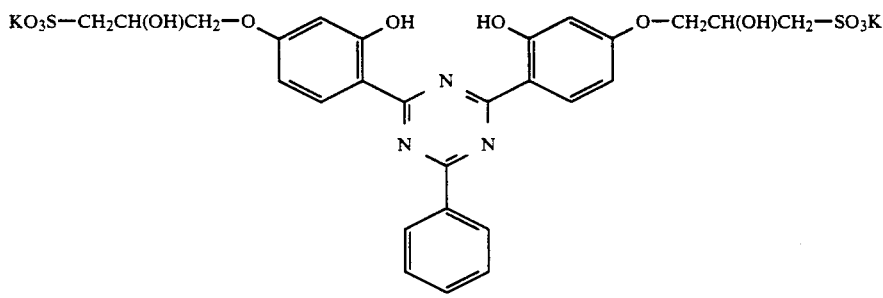

6. A method according to claim 1 wherein the compound of formula I is